Figure 1:
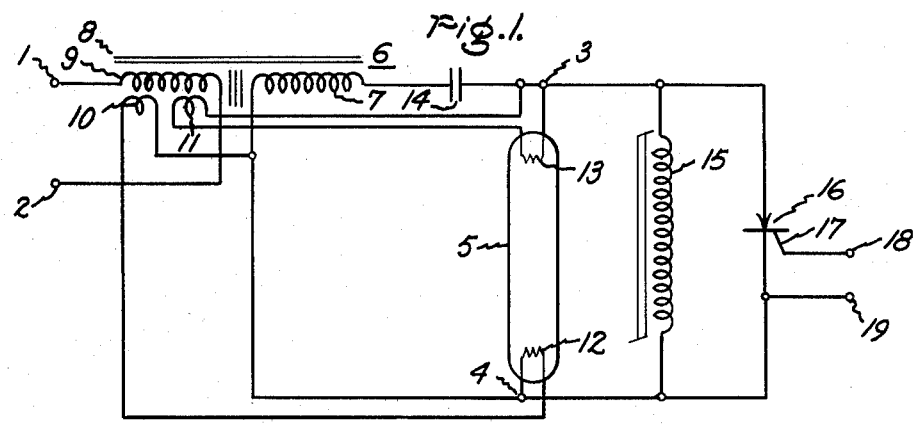

Dec. 7, 1965  H. W. LORD  3,222,573
FLUORESCENT LAMP DIMMING CIRCUIT
Filed Dec. 11, 1962  2 Sheets-Sheet 1

Inventor:
Harold W. Lord,
by John P. Dellitt
His Attorney.

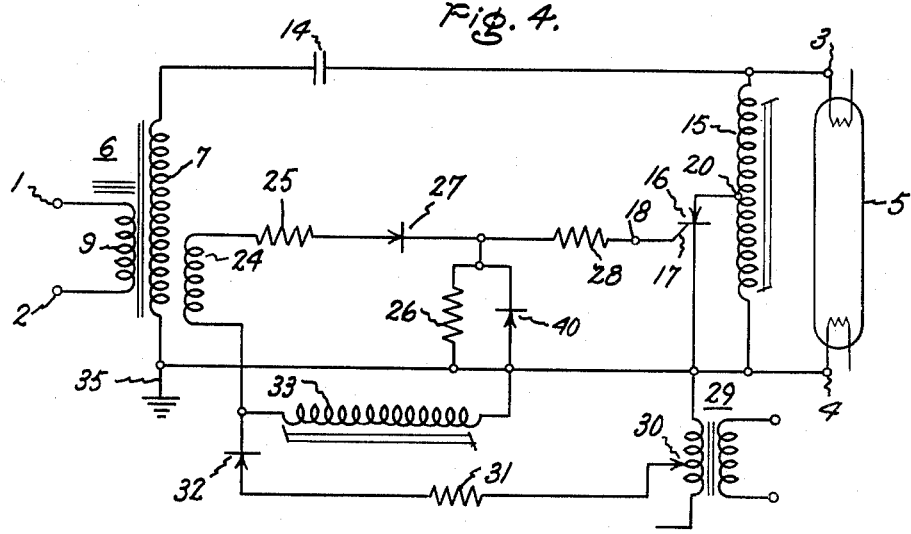
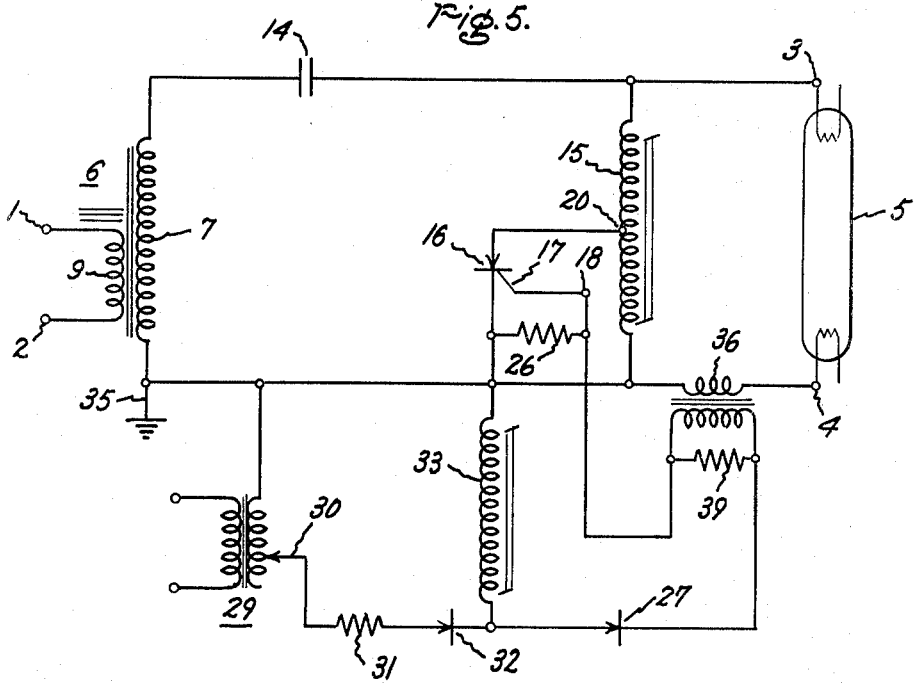

United States Patent Office 3,222,573
Patented Dec. 7, 1965

3,222,573
FLUORESCENT LAMP DIMMING CIRCUIT
Harold W. Lord, Schenectady, N.Y., assignor to General Electric Company, a corporation of New York
Filed Dec. 11, 1962, Ser. No. 243,833
10 Claims. (Cl. 315—194)

This invention relates to fluorescent lamp dimming circuitry and particularly to such circuitry for accurately regulating the lighting output of fluorescent lamps at low illumination levels.

Several known methods of controllably dimming fluorescent lighting circuits are satisfactory only at relatively high lighting levels. At low illumination levels where the fluorescent lamp circuit draws low current, these circuits are subject to line voltage fluctuations resulting in an excessive flicker in light output. Since the fluorescent lamp is a constant voltage drop device, an ordinary ballast in series therewith which is satisfactory at normal current levels, drops a disproportionately small voltage at small current levels resulting in impairment of its ballasting function. Changes in input voltage or lamp voltage can then produce undesirably large changes in lamp illumination.

At normal current levels a constant current ballast arrangement satisfactorily delivers current to a relatively fixed load, with changes in voltage. The desirable operating characteristic arises from the fact that during operation, the secondary core portion of such a transformer saturates during a part of each half cycle to hold an essentially constant output current. Although this device is satisfactory for constant brightness operation, the addition of the lamp current regulating function prevents the further addition of dimming circuits of the series variable impedance type.

A constant voltage transformer plus a ballast reactor is satisfactory for supplying fluorescent lamps dimmed with a series variable impedance but more than a threefold increase in the total volt-ampere rating of such a system results from the addition of the constant voltage transformer. Such an arrangement is excessively expensive and cumbersome.

Therefore it is a general object of the present invention to provide an improved dimming circuit for fluorescent lamps permitting lamp circuits to operate with controllable currents at a wide range of levels without producing excessive flicker.

Briefly stated, in accordance with an embodiment of the present invention, a fluorescent lamp circuit is energized through a high leakage reactance, lead type of ballast arrangement. The ballast is essentially a constant load current device and provides good regulation of lamp current over wide variations of input voltage and lamp voltage, the regulating properties being provided by the non-linearity of the magnetization characteristic of the high reactance secondary of a ballast transformer having a capacitor in series with the lamp. The circuit in accordance with the present invention maintains a nearly normal magnitude of current through the ballast transformer by providing a dimming circuit in parallel with the fluorescent lamp circuit. This dimming circuit is phase adjustable, that is it is operable on selected portions of the alternating current wave input to shunt a current away from the lamp or lighting circuit during a part of the input wave cycle.

In accordance with a feature of the present invention, the dimming circuit is a phase adjustable circuit including a controllable unilateral impedance comprising a controlled rectifier operated by a phase adjustable firing circuit which renders the rectifier conductive during a selectable precentage of successive input wave half cycles. For example, the rectifier may be poled to divert current away from the lamp during a selected portion of each positive half cycle of input waveform. During each opposite or negative half cycle, a similar proportion of the input current from the ballast transformer is diverted by a saturating reactor also in parallel with the fluorescent lamp circuit. The saturating reactor operates in a slaved relation to the controlled rectifier and has its flux reset by the action of the controlled rectifier whereby it substantially duplicates the shunting action of the controlled rectifier on half cycles of input current when the controlled rectifier is not carrying current. In this manner full wave action is provided. By controlling the portion of the input waveform during which shunting takes place, a wide range of lamp circuit light output is readily achieved.

Figure 2:
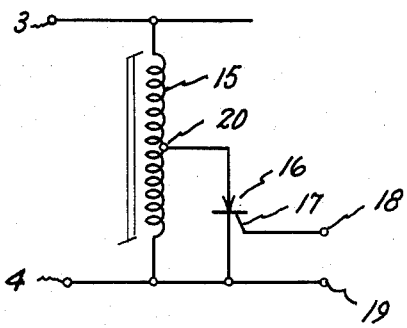
Figure 3:
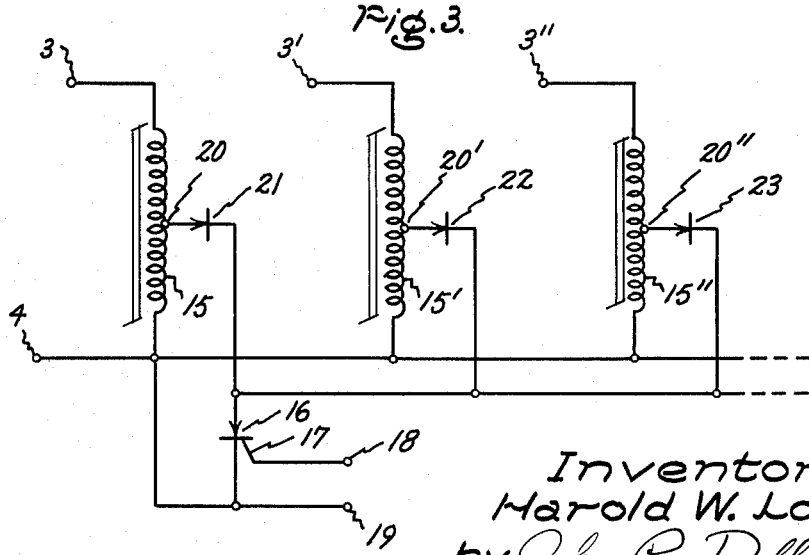

The novel features beleived characteristic of the invention are set forth in the appended claims. The invention itself, however, together with further objects and advantages thereof may best be understood by reference to the following description taken in connection with the accompanying drawings in which:

FIG. 1 is a schematic diagram of a first embodiment in accordance with the present invention, FIG. 2 is an alternative arrangement, schematically illustrated, for a second phase adjustable shunting circuit in accordance with the present invention, FIG. 3 illustrates controllable shunting circuitry in accordance with the present invention for a plurality of separate lamp circuits, FIG. 4 is a schematic diagram of a first phase-controlled trigger circuit for initiating conduction in a phase adjustable shunting circuit, and FIG. 5 is a second phase-controlled triggering circuit for initiating conduction of a phase adjustable shunting circuit.

In accordance with the illustrated embodiment I provide input power receiving terminals, output lamp energizing terminals for connection to one or more fluorescent lamps, and a ballast exhibiting a non-linear magnetization characteristic for securing a substantially steady alternating current to the fluorescent circuit when a current near rated current is delivered to the circuit.

In the FIG. 1 embodiment, the input power receiving terminals are designated 1 and 2, the output lamp energizing terminals are designated 3 and 4, and the ballast therebetween is referred to generally by the reference numeral 6 and includes capacitor 14. In accordance with the illustrated embodiment the reactance between the input and output terminals comprises a high reactance ballast transformer and capacitor arrangement, providing good regulation of lamp current over wide variations of input voltage when operated near rated current by having the core portion associated with the high reactance secondary 7 operate for a portion of each cycle in the saturation region of its excitation magnetization characteristic. In effect the secondary 7 is arranged to have a high leakage reactance with respect to the other windings while the associated portion of core 8 operates to and above the knee of the magnetization curve during a part of each half cycle so that current is not directly proportional to flux in the transformer secondary 7.

The ballast transformer 6 includes primary winding 9 connected across power input terminals 1 and 2 and filament windings 10 and 11 for respectively energizing heating filaments 12 and 13 of rapid start lamp 5. The filaments 12 and 13 form the end electrodes in the fluorescent lamp 5 and are accordingly connected to terminals 3 and 4 as illustrated. The capacitor 14 is inserted between secondary 7 and terminal 3 in order to present a leading power factor load to the high leakage reactance transformer and secure operation of the secondary core portion in saturation during a portion of each half cycle due to high current flow.

While one lamp is illustrated in the FIG. 1 embodiment, it is of course to be understood that a plurality of lamps in series may be substituted therefor. Furthermore, although a regulating ballast is preferred, it is understood the advantages of the present invention may be secured to an appreciable degree employing a conventional fluorescent lamp ballast arrangement.

In accordance with an important aspect of the present invention, there is provided a phase adjustable circuit comprising a saturating reactor and a controlled rectifier disposed substantially in parallel with the lamp. These elements are coupled across lamp energizing terminals 3 and 4. In accordance with the FIG. 1 embodiment, saturating reactor 15 is connected across terminals 3 and 4 while silicon controlled rectifier 16 is disposed substantially in parallel with reactor 15. The saturating reactor 15 is designed to draw only exciting current as disposed across lamp circuit 5 when this lamp is drawing rated current, i.e. when the controlled rectifier is not conducting. The coil turns and core area of the saturating reactor are designed such that the peak-to-peak flux density's swing in the core is normally less than twice the flux density of the knee of the magnetization curve for the core material employed.

The silicon-controlled rectifier as illustrated has its anode coupled to terminal 3 and its cathode coupled to terminal 4. The silicon-controlled rectifier also includes a control element 17 coupled to control terminal 18. A triggering circuit for initiating conduction in the silicon-controlled rectifier may be disposed between terminal 18 and a terminal 19, the cathode terminal of the silicon-controlled rectifier.

In operation, the circuit of FIG. 1 functions to provide adjustable dimming to lamp or lamp circuit 5 which may be accurately set to a given illumination without exhibiting flicker due to variations in supply voltage across terminals 1 and 2. Terminals 1 and 2 are connected to a source of alternating current power (not shown), for instance, the ordinary 110-volt line. At near rated current the ballast transformer and series capacitor is an essentially constant-current circuit. Therefore a steady current and illumination are provided by lamp 5, that is when lamp 5 is not dimmed.

At a selected time in each positive half cycle of input voltage, silicon-controlled rectifier 16 is caused to initiate conduction from the positive terminal to the negative terminal thereof through the use of a triggering circuit as hereinafter illustrated. For example the silicon-controlled rectifier may be fired after the lamp 4 has carried current for a period corresponding to 90° of the input waveform. The silicon-controlled rectifier is arranged to carry current for the remaining 90° of a given half cycle of the input waveform. This current approximates the current that would have been flowing in the lamp in the absence of the rectifier.

The lamp 5 is thereby appropriately dimmed as the silicon-controlled rectifier 16 diverts current away from lamp 5. In the example given, where the silicon-controlled rectifier starts conducting after 90° of the positive half cycle, and assuming the rectifier impedance to be much less than that of the lamp, the lamp 4 will be dimmed to about half average illumination for this half cycle.

During the ensuing negative half cycle, the silicon-controlled rectifier, being a unilateral impedance, does not conduct and for this reason saturating reactor 15 is placed substantially in parallel therewith. The saturating reactor will divert current away from lamp 5 for approximately the same portion of the negative half cycle as did the silicon-controlled rectifier 16 for the positive half cycle. The lamp 5 in the example given, will carry rated current for the first 90° of the negative half cycle whereupon saturating reactor 15 will saturate or "fire" to divert current from the lamp for the remaining 90° thereby completing a full cycle of input current operation. The saturating reactor is in effect "slaved" in its operation to the silicon-controlled rectifier. The saturating reactor 15 reaches its saturation point due to the magnetic flux conditions established in the core thereof by the hold off period of the silicon-controlled rectifier during the previous half cycle, that is by the exciting current supplied to the saturating reactor during the previous half cycle. The voltage across the silicon-controlled rectifier during a positive alternation functions in this manner to reset or re-adjust the flux density of the saturable core of saturating reactor 15 to a magnetic operating point on its hysteresis loop such that its core reaches saturation after a hold off period whose area is equal to the volt-time hold off area of the controlled rectifier during the preceding half cycle. Inductor 15 automatically passes a correct amount of current to make the average D.C. voltage across the load equal to zero for each whole cycle of operation. The average D.C. voltage across the reactor must necessarily be substantially zero.

Of course the example given, that is the triggering of the silicon-controlled rectifier after 90° of the first positive half cycle of alternating current operation is illustrative only. From a practical standpoint the shunting circuit comprising silicon-controlled rectifier 16 and saturable reactance 15 will act as well to provide symmetrical full wave shunting action at whatever angle of alternating current shunting action is initiated by silicon-controlled rectifier 16. The silicon-controlled rectifier is herein illustrated as highly advantageous and producing accurately controlled dimming; however, it is understood other controllable means for providing phase adjustment may be in some cases substituted therefor. For example a thyratron gaseous tube is suitable in some instances. The silicon-controlled rectifier arrangement is illustrated as being preferable not only for accuracy of control and rapid response time but also for economy of cost and space consumption in a lighting apparatus or the like. The phase adjustable control circuit comprising a self saturating reactor with a unilateral phase controlled impedance in parallel with at least a portion of the reactor is more fully set forth and particularly claimed in my concurrently filed application Serial No. 243,832, assigned to the assignee of the present invention.

FIG. 2 illustrates a connection for a phase adjustable circuit, comprising a saturating reactor 15 and silicon-controlled rectifier 16 wherein the silicon-controlled rectifier anode terminal is connected to the tap 20 on the saturating reactor winding. The circuit is otherwise coupled to output lamp energizing terminals 3 and 4 in the same manner as hereinbefore illustrated. The FIG. 2 circuit is advantageous when the peak voltage required to start the lamp is high compared to the peak voltage rating of the silicon-controlled rectifier. The saturating reactor performs the dual function of converting the half wave control action of the silicon-controlled rectifier into a full wave control action, and that of reducing the peak voltage requirements of the silicon-controlled rectifier. Since the peak voltage appearing across the silicon-controlled rectifier is reduced, the circuit may be employed to operate a plurality of lamps in series thereby reducing the ballast costs and ballast size as compared with using an individual ballast for each lamp.

FIG. 3 illustrates a circuit wherein the single silicon-controlled rectifier 16 adjusts the dimming of a plurality of lamps disposed between output lamp energizing terminals 3 and 4, 3' and 4, and 3'' and 4, etc. Each such fluorescent lamp or fluorescent lamp circuit may be conveniently disposed at separate locations and in separate lamp housings. Each circuit may include a separate ballast and may be otherwise the same as illustrated in FIG. 1. A separate saturating reactor 15 is disposed across terminals 3 and 4 while saturating reactor 15' is disposed across terminals 3' and 4 and a saturating reactor 15" is disposed across terminals 3" and 4. The saturating reactors are each conveniently provided with taps 20, 20' and 20", respectively. Diodes 21, 22 and 23 have their anode terminals connected to these respective taps and their cathode terminals connected in common to the anode terminal of silicon-controlled rectifier 16. The diodes 21–23 normally prevent the flow of currents between the saturating reactors so that each ballast circuit operates independently until the silicon-controlled rectifier fires. The diodes 21–23 are poled to carry current in the same direction as the forward direction of the silicon-controlled rectifier and therefore act to couple the control shunting action of the rectifier to each one of the saturating reactors. Silicon-controlled rectifier 16 should, of course, be capable of carrying the sum of the currents provided to the individual lamps. Otherwise the circuit operation is identical to that of the single circuit as hereinbefore set forth.

FIGS. 4 and 5 illustrate triggering circuitry for initiating conduction of controlled rectifier as hereinbefore set forth. A simplified version of the dimming circiut in accordance with the present invention is also illustrated, including a ballast transformer 6 and capacitor 14, fluorescent lamp 5, and a shunting circuit comprising saturating reactor 15 and silicon-controlled rectifier 16.

Referring particularly to FIG. 4, control terminal 18 is provided with an alternating voltage from the winding 24, also included on the core of a high reactance ballast transformer 6. This voltage is poled for establishing conduction in silicon-controlled rectifier 16 for those half cycles during which conduction of silicon-controlled rectifier is possible. The resulting current for firing reaches control element 17 through a series circuit including resistor 25, diode 27, resistor 28 and a saturating reactor 33. This requires diode 27 to be poled to permit current flow to control element 17 for initiating conduction of the silicon-controlled rectifier. Resistor 26 is shunted by negatively poled diode 40 for preventing the appearance of a negative voltage at control element 17. The juncture of resistor 26 and saturating reactor 33 is grounded in common with the grounded end of secondary 7. Control element terminal 18 is coupled to the juncture between diode 27 and resistor 26 via limiting resistor 28.

In the unsaturated state, the saturating reactor 33 presents such a high impedance to the flow of current in the aforementioned series circuit that insufficient voltage drop is produced across resistor 26 to fire the silicon-controlled rectifier. However, after a few cycles of circuit operation, the saturating reactor 33 becomes saturated and the silicon-controlled rectifier 16 fires at the start of each positive half cycle to produce maximum dimming in the manner hereinbefore set out. An additional transformer 29, which may form a part of transformer 6, has its secondary returned to ground and has a variable tap at 30 to produce a variable output voltage with respect to ground which is substantially in phase with the voltage on winding 24. Tap 30 is coupled through resistor 31 and diode 32 to the juncture of saturating reactor 33 and winding 24. The diode 32 is poled to provide a voltage, which is in opposite polarity to the voltage from winding 24 through diode 27, across saturating reactor 33 for the purpose of resetting this reactor during alternate half cycles when silicon-controlled rectifier 16 is incapable of conduction. By adjusting tap 30 the saturating reactor 33 can be reset to any desired degree. For example, if tap 30 is set to the same voltage as the voltage secured from winding 24, the saturating reactor 33 is reset to the maximum degree and its impedance prevents firing of the silicon-controlled rectifier 16 during any portion of the cycle; maximum light output is the result. Smaller voltages derived from tap 30 on transformer 29 provide a smooth dimming scale of operation.

The triggering circuit of FIG. 4 may be described as being voltage responsive because the triggering signal for operating the silicon-controlled rectifier is ultimately derived from the input voltage across a winding of transformer 6. In FIG. 5 there is illustrated a triggering circuit sensitive to the load or lamp current. This circuit operates in a manner essentially the same as the circuit of FIG. 4 as regards like components indicated by like reference numerals and therefore its operation need not be described in detail. The input for the saturating reactor 33 is taken across a resistor 39 coupled to the secondary of a current transformer 36 whose primary is disposed in series with lamp 5. The saturating reactor receives this input via diode 27 and resistor 26 in series therewith and will permit a voltage drop across resistor 26 sufficient for triggering the silicon-controlled rectifier in the event the reactor becomes saturated. The time of saturation within each cycle is controlled by a resetting signal applied to the saturating reactor on alternate half cycles from transformer 29 through resistor 31 and diode 32. The resistor 39 across the secondary of transformer 36 operates to convert lamp current to a volt-time representation of the hold-off period before the firing of the silicon-controlled rectifier. When saturating reactor 33 "fires," the silicon-controlled rectifier will be turned on by a spike of voltage on its control electrode derived across resistor 26, after which lamp current will cease until the next half cycle.

From the foregoing it is evident the present invention provides a simple and economical circuit for dimming fluorescent lamps between high output and very low output without incurring the disadvantage of flicker at low light output levels. This is achieved by operation on the good-regulation portion of the ballast characteristic through continuing to draw near rated current through the ballast means even when the lamps are controlled to a low current, low light output condition.

A full wave control circuit is provided across the lamp circuit and is phase adjustable, diverting current from the lamp without reducing the current through the regulating type ballast. Desirable dimming characteristics are achieved although simple and compact components are utilized, capable of being housed in a compact fluorescent lamp installation.

While the invention has been described with respect to certain specific embodiments, it will be appreciated that many modifications and changes may be made by those skilled in the art without departing from the spirit of the invention, and I intend by the appended claims, to cover all such modifications and changes as fall within the true spirit and scope of my invention.

What I claim as new and desire to secure by Letters Patent of the United States is:

1. A lamp dimming circuit comprising input power receiving terminals, output lamp energizing terminals suitable for connections across a fluorescent lamp, a current limiting ballast impedance intermediate said input and said output terminals, and a phase adjustable shunting circuit disposed across said output terminals for diverting current substantially equal to the current said lamp would have taken for a portion of the time power is supplied to said power input terminals.

2. A lamp dimming circuit comprising input power receiving terminals, output lamp energizing terminals adapted for connection across a lamp, a reactance intermediate said input and said output terminals, said reactance having the property of transmitting a regulated current to said output terminals and including magnetic means operated in a non-linear magnetization region near saturation in the presence of fluctuations in voltage at said input terminals, and a phase adjustable shunting circuit disposed across said output terminals for diverting current substantially equal to the current the lamp would have taken, which normally operates said reactance in said non-linear magnetization region for a portion of the time power is supplied to said power input terminals.

3. A fluorescent lamp dimming circuit comprising power input terminals, lamp supplying terminals for connection across a fluorescent lamp device, high reactance ballast means serially disposed between said input terminals and said lamp supplying terminals, said ballast means operating in a mode of non-linear magnetization thereby having the property of delivering a near constant current to a fluorescent lamp over a range of line voltage, and phase adjustable means disposed across said lamp supplying terminals for diverting current away from said fluorescent lamp during selected portions of the input power waveform.

4. A fluorescent lamp dimming circuit comprising input power receiving terminals, fluorescent lamp supply terminals, a high reactance ballast transformer intermediate said sets of terminals having the property of smoothing fluctuations of input voltage when operated at rated load current by operating near magnetic saturation in said transformer's secondary magnetic core portion, a controlled unidirectional impedance coupled substantially across said fluorescent lamp supply terminals for shunting current away from said lamp for a portion of the input voltage cycle, and a saturating reactor also coupled substantially across the fluorescent lamp supply terminals causing the effective shunting impedance across the lamp to be bidirectional.

5. A fluorescent lamp dimming circuit comprising input power receiving terminals, output lamp energizing terminals, a high reactance lead type ballast intermediate said sets of terminals, a silicon-controlled rectifier coupled substantially across said lamp energizing terminals, and a saturating reactor also coupled substantially across said output lamp energizing terminals, said saturating reactor normally drawing an exciting current establishing a peak-to-peak flux density swing in the core thereof less than twice the flux density of the knee of the magnetization curve for the core thereof when the silicon-controlled rectifier is non-conducting but capable of saturation as reset of said reactor is limited by conduction of said silicon-controlled rectifier on alternate half cycles of the input power waveform.

6. A fluoresent lamp dimming circuit comprising input power receiving terminals, output lamp energizing terminals, a reactance means intermediate said sets of terminals for coupling said terminals together, acting as a fluorescent lamp ballast and providing a good regulation of lamp current over variations in input voltage by virtue of non-linearity of the magnetization characteristic of the said reactance means when operated near rated current, a saturating reactor coupled substantially across said lamp energizing terminals, and a controlled rectifier in shunt with at least a portion of said saturating reactor for co-operating with said reactor to draw near said rated current of said output lamp, said rectifier and reactor controllably shunting said near rated current from said lamp.

7. The apparatus according to claim 6 wherein said controlled rectifier is tapped down on said saturating reactor to reduce the peak voltage applied across said controlled rectifier.

8. The apparatus according to claim 6 further including circuitry for triggering said controlled rectifier for conduction at a given point in the waveform of voltage across said controlled rectifier.

9. A fluorescent lamp dimming apparatus comprising a pair of alternating current power input terminals, output terminals for supplying a lamp circuit, a high reactance ballast transformer having a primary winding coupled across said power input terminals, said high reactance ballast transformer having a high leakage reactance secondary coupled to said output terminals and operating on non-linear portion of its excitation magnetization characteristic near rated current for said secondary, a capacitance serially interposed between said secondary and said output terminals to cause the high reactance secondary to operate on a non-linear portion of its characteristic, a fluorescent lamp circuit coupled across said output terminals, a silicon-controlled rectifier having first and second power transmitting terminals coupled substantially across said output terminals and having a control terminal, means coupled to said control terminal for operating said silicon-controlled rectifier to adjustably divert current otherwise flowing through said fluorescent lamp circuit during a controlled portion of successive half cycles of the A.C. input power waveform as received at said input power receiving terminals, and a saturating reactor coupled substantially across said output terminals, the flux density of said reactor being less than the flux density at the knee of the magnetization curve of the core thereof when said fluorescent lamp is drawing current, and drawing an average current equal to the current drawn by the silicon-controlled rectifier during the next succeeding half cycle after the silicon-controlled rectifier draws said average current.

10. A fluorescent lamp dimming circuit for a plurality of fluorescent lamp circuits comprising power input terminals, plural sets of fluorescent lamp energizing terminals, reactance ballast means between said input terminals and said lamp energizing terminals operating in a non-linear region of the magnetization characteristic thereof whereby fluctuations in input voltage tend not to affect fluorescent lamp current, a plurality of saturating reactors, one coupled substantially across each set of lamp energizing terminals, a controlled unilateral conductor having a pair of principal current carrying terminals one of which is coupled to a common end of each of said saturating reactors, said controlled unilateral impedance also having a control terminal, and a plurality of further unilateral impedances coupled from points upon said saturating reactors substantially remote from said common terminal and coupled to the remaining terminal of said controlled unilateral impedance, said further unilateral impedances being poled to pass current in a common direction with said controlled unilateral impedance, and circuit means coupled to the control terminal of said controlled unilateral impedance for initiating conduction thereof during a portion of the power waveform applied to said input power receiving terminals.

References Cited by the Examiner

UNITED STATES PATENTS

| | | | |
|---|---|---|---|
| 2,054,496 | 9/1936 | Craig | 323—82 |
| 3,031,598 | 4/1962 | Bell | 315—100 |
| 3,107,317 | 10/1963 | Ouletta | 315—282 |

JOHN W. HUCKERT, *Primary Examiner.*

DAVID J. GALVIN, *Examiner.*